Dec. 20, 1960   L. W. GRIEDER   2,965,420
ROLLER BEARING
Filed Oct. 9, 1959

INVENTOR.
LOUIS W. GRIEDER
BY
McMorrow, Berman + Davidson
ATTORNEYS

United States Patent Office 2,965,420
Patented Dec. 20, 1960

2,965,420
ROLLER BEARING
Louis W. Grieder, 19 Travers St., Manhasset, N.Y.
Filed Oct. 9, 1959, Ser. No. 845,500
5 Claims. (Cl. 308—206)

The present invention relates to an antifriction roller bearing generally and in particular to a bearing employing both roller and ball bearings.

Roller bearings have been previously proposed and are presently in use which have inner and outer rings with alternatingly arranged and cooperatively disposed roller and ball bearings interposed between the rings. Such bearings are intended for use in journal boxes and elsewhere where both radial and thrust loads are carried. The bearings proposed have not met with universal acceptance for many reasons. A chief objection to one form of this type of bearing resides in the excessive number of parts composing the bearing, the difficulty of manufacturing to close tolerances the parts of the bearing, the difficulty of assembling the bearing parts, and the inefficiency of such a bearing when not manufactured to extremely close tolerances. Another purpose of the bearings proposed resides in the fact that the bearings are designed to carry only thrust loads applied longitudinally of the bearing axis or radial loads applied perpendicularly or normal to the bearing axis.

An object of the present invention is to provide a roller bearing having a minimum number of components, one assembled and dissembled with ease and facility, one requiring little or no service or attention over a period of usefulness, and one which is economically feasible.

Another object of the present invention is to provide a roller bearing which lends itself to the carrying of thrust loads applied at any angle to the bearing axis and radial loads applied at any angle to the bearing axis.

A further object of the present invention is to provide a roller bearing in which are rollers and balls having peripheral and surface portions rollably engaged, and having inner and outer rings provided with grooves and recesses in turn engaging peripheral portions and surfaces at non-opposed points of contacts of the balls and rollers with the inner and outer rings.

These and other objects and advantages of the present invention will be fully apparent from the following description when taken in conjunction with the annexed drawing, in which.

Figure 1:
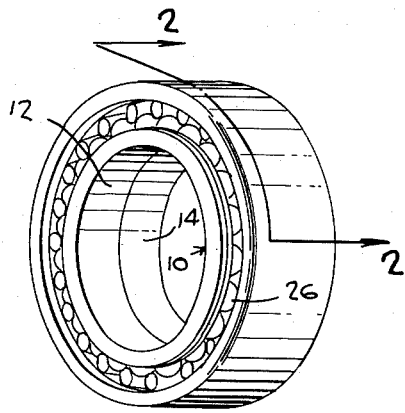
Figure 1 is an isometric view of the roller bearing according to the present invention.
Figure 3:
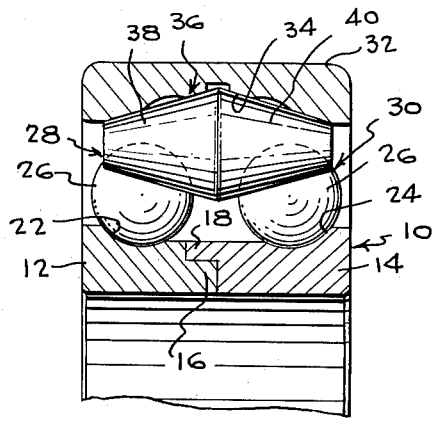
Figure 3 is a view taken on the line 3—3 of Figure 2.
Figure 2:
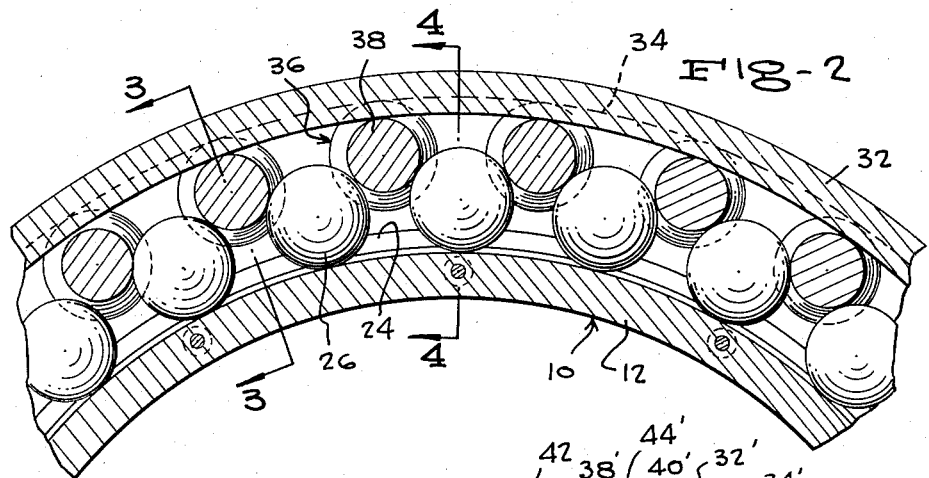
Figure 2 is a view on an enlarged scale, taken on the line 2—2 of Figure 1.
Figure 4:
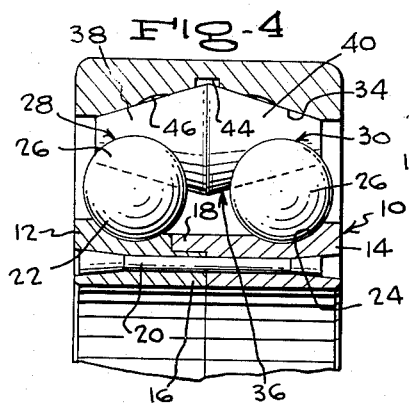
Figure 4 is a view taken on the line 4—4 of Figure 2.

Referring to the drawing, in Figures 1 to 4, inclusive, the reference numeral 10 designates an inner ring of the bearing of the present invention, the ring 10 being formed of ring members 12 and 14 having interlocking annular portions 16 and 18, respectively, and being separably secured together by means of swaged pins 20, as shown in Figure 4.

The ring members 12 and 14 are provided with machined groove walls 22 and 24, respectively, together forming a groove in the inner ring 10 into which extends peripheral portions of balls 26 disposed in two rows 28 and 30, with the rows 28 and 30 arranged in side by side spaced relation with the balls 26 of the rows 28 and 30 positioned so as to extend about the outer periphery of the ring 10. The peripheral portions of the balls 26 of the rows 28 and 30 rollably engage the wall of the groove formed by the groove walls 22 and 24 in the ring members 12 and 14.

An outer ring 32 is circumposed about and spaced from the rows 28 and 30 of the balls 26. The ring 32 is provided with a recess 34.

The present invention provides a plurality of rollers 36, each embodying two frusto-conically shaped members 38 and 40 integrally secured together.

The members 38 and 40 of each roller 36 are arranged so that the larger ends abut each other and the smaller ends are longitudinally aligned with each other. The recess 34 in the ring 32 is conformably shaped to the contour of the integrally attached members 38 and 40 of each roller 36.

Figure 5:
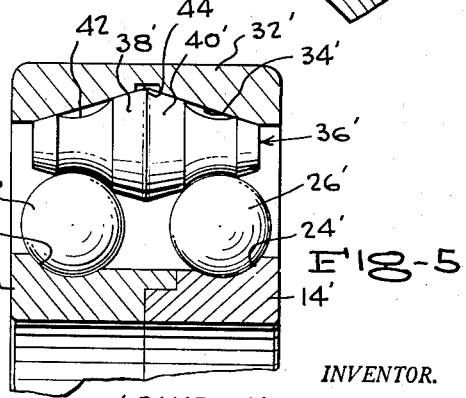
Figure 5 is a sectional view, similar to Figure 4, of a modified form of the roller bearing according to the present invention.

In the form of the invention shown in Figure 5, the ring members 12' and 14' are secured together by the same means as is shown in Figure 4 with reference to the members 12 and 14. The outer ring 32' is provided with a recess 34' in which is rollably engaged a plurality of rollers 36', each having inwardly of and intermediate the larger and smaller ends of the conically shaped members 38' and 40', an annular groove 42, the wall of which is conformably shaped to and is rollably engaged by a peripheral portion of each of the balls 26'.

The forms of the invention shown in Figures 1 to 4, and in Figure 5, are each provided with a cut-out groove 44, 44', respectively, receiving the apex of each roller 36, 36'. The apex of the rollers 36, 36', consists in the abutting larger ends of the members 38, 38', and 40, 40'.

In the form of the invention shown in Figures 1 to 4, inclusive, the wall of the recess 34 is provided with shallow arcuately formed grooves 46 for the retention of oil therein for lubricating the adjacent rollers 36.

In use, the bearing of the present invention may be assembled and lubricated and installed in any location requiring the carrying of radial and thrust loads applied to the bearing in any angle to the perpendicular or longitudinal axis of the bearing. It will be found that the rollers 36, with their peripheral portions engaging the wall of the recess 34 provided in the ring 32 (or recess 34' in the ring 32') and with the rollers 36, 36' engaging peripheral portions of the balls 26, 26' and the balls 26, 26' having peripheral portions rollably engaged in the groove provided by the groove walls 22 and 24 (or groove walls 22' and 24', of the form of the invention shown in Figure 5), the bearing of the present invention will accommodate radial loads and thrust loads at every angle to the axis of the bearing.

What is claimed is:

1. In a roller bearing, an inner ring having a groove extending about the outer periphery, at least two rows of balls arranged in side by side spaced relation positioned so as to extend about the outer periphery of said ring and having peripheral portions thereof extending into and rollably engaging the wall of said groove, an outer ring circumposed about and spaced from said rows of balls, and a plurality of rollers each embodying two frusto-conically shaped members arranged so that the larger ends abut each other with the smaller ends longitudinally aligned with each other, said rollers being interposed between said outer ring and said balls and rollably engaging the wall of a recess formed in the inner periphery of said outer ring and peripheral portions of said balls.

2. In a roller bearing, an inner ring having a groove extending about the outer periphery, at least two rows of balls arranged in side by side spaced relation positioned so as to extend about the outer periphery of said ring and having peripheral portions thereof extending into and rollably engaging the wall of said groove, an outer ring circumposed about and spaced from said rows of balls, and a plurality of rollers each embodying two frusto-conically shaped members arranged so that the larger ends abut each other with the smaller ends longitudinally aligned with each other, the inner periphery of said outer ring being provided with a recess conformably shaped to the contour of one of said rollers, said rollers being interposed between said outer ring and said balls and rollably engaging the wall of said recess of said outer ring and peripheral portions of said balls.

3. In a roller bearing, an inner ring having a groove extending about the outer periphery, at least two rows of balls arranged in side by side spaced relation positioned so as to extend about the outer periphery of said ring and having peripheral portions thereof extending into and rollably engaging the wall of said groove, an outer ring circumposed about and spaced from said rows of balls, and a plurality of rollers each embodying two frusto-conically shaped members arranged so that the larger ends abut each other with the smaller ends longitudinally aligned with each other, the inner periphery of said outer ring being provided with a recess conformably shaped to the contour of one of said rollers, said rollers being interposed between said outer ring and said balls with the conical surfaces of said rollers rollably engaging the wall of said recess of said outer ring and peripheral portions of said balls.

4. In a roller bearing, an inner ring having a groove extending about the outer periphery, at least two rows of balls arranged in side by side spaced relation positioned so as to extend about the outer periphery of said ring and having peripheral portions thereof extending into and rollably engaging the wall of said groove, an outer ring circumposed about and spaced from said rows of balls, and a plurality of rollers each embodying two frusto-conically shaped members arranged so that the larger ends abut each other with the smaller ends longitudinally aligned with each other, each of said members being provided with an annular groove intermediate the larger and smaller ends, said rollers being interposed between said outer ring and said balls and rollably engaging the wall of a recess formed in the inner periphery of said outer ring, with each of said balls of each row of balls having a peripheral portion rollably engaging the wall of the adjacent roller member annular groove.

5. In a roller bearing, an inner ring having a groove extending about the outer periphery, at least two rows of balls arranged in side by side spaced relation positioned so as to extend about the outer periphery of said ring and having peripheral portions thereof extending into and rollably engaging the wall of said groove, an outer ring circumposed about and spaced from said rows of balls, and a plurality of rollers each embodying two frusto-conically shaped members arranged so that the larger ends abut each other with the smaller ends longitudinally aligned with each other, the inner periphery of said outer ring being provided with a recess conformably shaped to the contour of one of said rollers, each of said members being provided with an annular groove intermediate the larger and smaller ends, said rollers being interposed between said outer ring and said balls and rollably engaging the wall of said recess of said outer ring, with each of said balls of each row of balls having a peripheral portion rollably engaging the wall of the adjacent roller member annular groove.

References Cited in the file of this patent

UNITED STATES PATENTS

| | | |
|---|---|---|
| 953,789 | Massman | Apr. 5, 1910 |
| 1,443,115 | Breese | Jan. 23, 1923 |
| 1,796,616 | O'Connor | Mar. 17, 1931 |